United States Patent [19]

Avetisian et al.

[11] Patent Number: 5,705,035
[45] Date of Patent: *Jan. 6, 1998

[54] TIRE LIQUEFYING PROCESS REACTOR DISCHARGE SYSTEM AND METHOD

[75] Inventors: Vahan Avetisian, Burbank; Craig Joseph Castagnoli, Rowland Heights; Suk-Bae Cha, Long Beach, all of Calif.

[73] Assignee: Texaco, Inc., White Plains, N.Y.

[ * ] Notice: The term of this patent shall not extend beyond the expiration date of Pat. No. 5,464,503.

[21] Appl. No.: 637,693

[22] PCT Filed: Oct. 27, 1994

[86] PCT No.: PCT/US94/12303

§ 371 Date: May 28, 1996

§ 102(e) Date: May 28, 1996

[87] PCT Pub. No.: WO95/11951

PCT Pub. Date: May 4, 1995

Related U.S. Application Data

[63] Continuation of Ser. No. 142,014, Oct. 28, 1993, Pat. No. 5,464,503.

[51] Int. Cl.[6] .................. C10B 47/18; C10B 53/00
[52] U.S. Cl. .................. 201/3; 201/25; 201/32; 202/118; 202/226; 585/241
[58] Field of Search .................. 201/3, 25, 32; 202/118, 226; 585/241

[56] References Cited

U.S. PATENT DOCUMENTS

| | | | |
|---|---|---|---|
| 4,686,008 | 8/1987 | Gibson | 202/118 |
| 5,057,189 | 10/1991 | Apffel | 202/113 |
| 5,411,714 | 5/1995 | Wu et al. | 422/232 |
| 5,464,503 | 11/1995 | Avetisian et al. | 201/3 |

*Primary Examiner*—Nina Bhat
*Attorney, Agent, or Firm*—Henry H. Gibson; Charles B. Rodman; Philip Rodman

[57] ABSTRACT

A discharge system is used with a tire liquefaction process using a reactor. The system includes a receiver receiving unreacted components, including oil coated metal from the reactor. The unreacted components are moved through a pyrolysis reactor where they are heated to a temperature sufficient to convert the unreacted hydrocarbon components to a liquid and to a gas by way of pyrolysis. The liquid and the majority of gas are drawn off from the pyrolysis reactor. Discharge apparatus connected to the pyrolysis reactor converts the remaining gas to a condensate and discharges the metal. The condensate is also removed for further use.

11 Claims, 1 Drawing Sheet

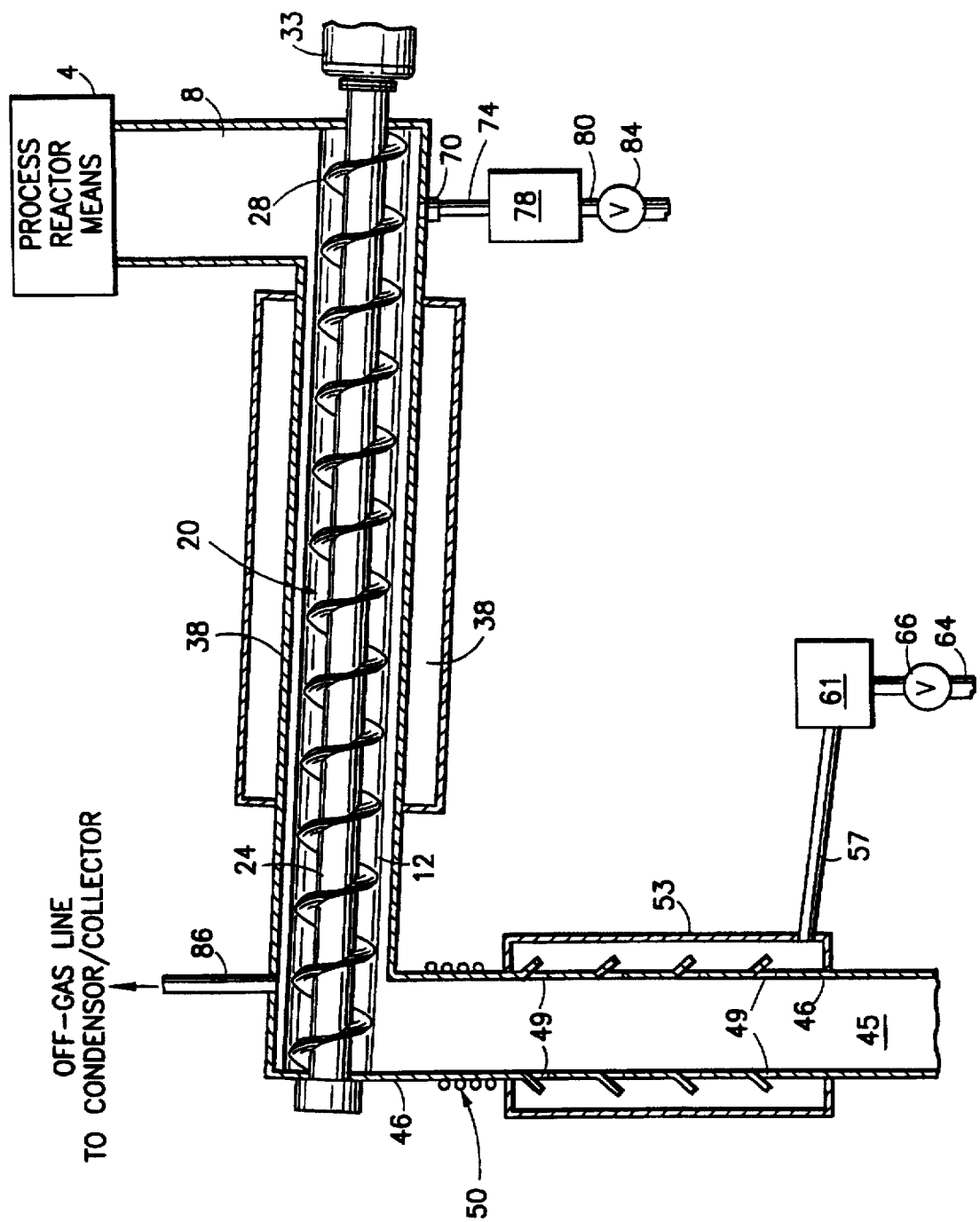

TIRE LIQUEFYING PROCESS REACTOR DISCHARGE SYSTEM AND METHOD

This application is a continuation of Ser. No. 08/142,014 filed Oct. 28, 1993, now U.S. Pat. No. 5,464,505.

BACKGROUND OF THE INVENTION

Field of the Invention

The present invention relates to means and methods for discharging unreacted components from a reaction process and, more particularly, to discharge unreacted components from a tire liquefying process.

SUMMARY OF THE INVENTION

A discharge system is used with a tire liquefying process using a reactor. The system includes a receiver receiving unreacted components, including oil coated metal, from the reactor. The unreacted components are moved through a pyrolysis reactor where they are heated to a temperature sufficient to convert the unreacted hydrocarbon components to a liquid and to gas by way of pyrolysis. The liquid and the majority of gas are drawn off from the pyrolysis reactor. Discharge apparatus connected to the pyrolysis reactor converts the remaining gas to a condensate and discharges the metal. The condensate is also removed for further use.

The object and advantages of the invention will appear more fully hereinafter from a consideration of the detailed description which follows, taken together with the accompanying drawing, wherein one embodiment of the invention is illustrated by way of example. It is to be expressly understood, however, that the drawing is for illustration purposes only and is not to be construed as defining the limits of the invention.

DESCRIPTION OF THE DRAWING

The FIGURE is a graphical representation of a discharge system constructed in accordance with the present invention.

DESCRIPTION OF THE INVENTION

Referring to the drawing, process reactor means 4, which may be of the type described and disclosed in a U.S. patent application Ser. No. 08/053,727, filed Apr. 27, 1993, is used to react tires and liquid oil, generally in the form of waste oil, to convert most hydrocarbon components of the tires to tire oil. However, in the process, there are unreacted components. Many of the shredded tires, if not all of the shredded tires, will have pieces of metal in them, either from the steel belt, in the steel belted radial-type tires, or from the beading around the edge of the tires. Further, there will also be other unreacted hydrocarbon components. The unreacted components are discharged from process reactor means 4 through a discharge system of the present invention which includes a downward chute-type element 8 connected to a predominantly horizontally arranged conduit element 12. Although the terminology predominantly horizontal has been used, its only used to describe conduit element 12 in spatial relationship to element 8 and other chute-type elements to follow. It is in fact, at a slight angle upward commencing from chute 8, sufficient to let a liquid flow down conduit element 12.

A screw auger 20 having a shaft 24 and a spiral-type blade 28 is continually rotated by drive means 33. Surrounding a portion of conduit element 12 is a pyrolysis reactor 38. Pyrolysis reactor 38 is actually a plurality of electrical surface heaters manufactured by Watlow Inc. mounted on the outer surface of conduit element 12. The output of coils 50 is wrapped around a non-vented portion of chute 45 and carry a cooling liquid such as water as hereinafter explained. Chute 45 is vented with flared vents 49 at various locations and surrounding the venting portion of chute 45 is a chamber 53. Chamber 53 has a pipe 57 connected to tank means 61. Tank means 61 has a discharge pipe 64 including a valve 66.

Similarly, as noted earlier, the conduit element 12 is at one angle of inclination; the bottom of chute 8 is at different angle of inclination so that any fluid as hereinafter explained is directed towards a opening having a screen 70 covering the inlet to a pipe 74. Pipe 74 is connected to another tank means 78 whose outlet pipe 80 includes a valve 84.

Further conduit element 12 has an outlet pipe 86 which causes the majority of the gas to be removed from conduit element 12 and provided to a condensor/collector not shown.

In operation as the unreacted components of the shredded tires fall from process reactor means 4 through chute 8, where they are moved by screw auger 20 through conduit element 12 in a slightly upward direction towards chute 45. In this process, the oil/metal mixture is heated by pyrolysis reactor 38 to a temperature in a temperature range of 900° F. to 1500° F. The unreacted hydrocarbon components are pyrolyzed into a liquid and gas. The liquid drains down conduit element 12 towards drain 70 and passes through pipe 74 into tank means 78. As noted, the majority of the gas leaves via pipe 86, however, the remaining gas and the metal components keep moving upward towards chute 45. Gas accumulates in chute 45 with some of it coming in contact with cool walls of chute 45.

Coils 50 are provided with a cooling liquid, which may be water or any other type of liquid desired, causing a cool area on the surface of chute 45 thereby causing condensing of the gas entering chute 45 to form condensate on cooled walls 46 in that area. The condensate flows down walls 46 and drains off at the various vents 49. As the condensate flows on the surface of vent 49, the flare-up causes the condensate to drip. A thermal syphon effect exists in the cooling position of chute 45 thereby facilitating the condensation of the gas on walls 46. The liquid in chamber 53 passes through line 57 and into tank means 61.

Meanwhile, the metal components in chute 45 emerge from chute 45 cleaned, dried and ready for recycling.

We claim:

1. A discharge method associated with a tire liquefying process using a process reactor, comprising the steps of:
   receiving unreacted hydrocarbons and metal components of tires from a tire liquefying process reactor through a first vertical conduit;
   moving the unreacted components with an auger screw means;
   heating the moving unreacted components to a temperature sufficient to convert the unreacted hydrocarbon components to a liquid and a gas by pyrolysis;
   drawing off the liquid;
   drawing off most of the gas;
   cooling the remaining gas after pyrolysis that is not drawn off to a condensate in a vertical conduit with flared vent means;
   drawing off the condensate from the vertical conduit; and
   discharging unreacted metal components through the vertical conduit that is used to cool and condense the remaining gas.

2. The method of claim 1, wherein said moving step comprises moving the unreacted components through a tube oriented at a slight angle to a horizontal plane and connected to said first, vertical conduit.

3. The method of claim 2, wherein said moving step additionally comprises moving the unreacted components through said tube with an auger screw.

4. The method of claim 3, wherein said discharging step comprises discharging said metal components through a second, vertical conduit connected to said tube.

5. A discharge system for a tire liquefying process reacting tires and oil using a process reactor, comprising:

means for receiving unreacted hydrocarbon and metal components of the tires from a process reactor;

a pyrolysis reactor connected to said receiving means, said pyrolysis reactor having means for moving said unreacted components therethrough and means for heating the unreacted components to a temperature sufficient to convert the unreacted hydrocarbon components to a liquid and to a gas by way of pyrolysis;

means for drawing off the liquid and most of the gas from the pyrolysis reactor;

means connected to said pyrolysis reactor for converting the remaining gas to a condensate;

means connected to said converting means for drawing off said condensate; and means connected to the pyrolysis reactor for discharging the metal components.

6. The system of claim 5, wherein said receiving means comprises a first, vertical conduit for conveying said unreacted components to said pyrolysis reactor moving means.

7. The system of claim 6, wherein said pyrolysis reactor moving means comprises a tube oriented at a slight angle to a horizontal plane to allow fluid to flow due to gravity, said tube being connected to said first, vertical conduit.

8. The system of claim 7, wherein said pyrolysis reactor moving means comprises an auger screw within said tube.

9. The system of claim 8, wherein said discharge means includes a second, vertical conduit connected to said tube.

10. The system of claim 9, wherein said converting means comprises means for cooling the gas that has entered the converting means from the tube to form a condensate.

11. The system of claim 10, wherein said converting means additionally comprises means for removing said condensate.

* * * * *